(12) United States Patent
Floyd et al.

(10) Patent No.: US 7,711,994 B2
(45) Date of Patent: *May 4, 2010

(54) APPARATUS, SYSTEM AND COMPUTER PROGRAM PRODUCT FOR SEAMLESSLY INTEGRATING THERMAL EVENT INFORMATION DATA WITH PERFORMANCE MONITOR DATA

(75) Inventors: Michael Stephen Floyd, Austin, TX (US); Alexander Erik Mericas, Austin, TX (US); Robert Dominick Mirabella, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 33 days.

This patent is subject to a terminal disclaimer.

(21) Appl. No.: 12/131,070

(22) Filed: May 31, 2008

(65) Prior Publication Data

US 2008/0244330 A1    Oct. 2, 2008

(51) Int. Cl.
*G06F 11/00* (2006.01)
(52) U.S. Cl. .................... 714/47; 702/132; 374/103
(58) Field of Classification Search .................. 714/47; 702/132, 185, 187; 374/103
See application file for complete search history.

(56) References Cited

U.S. PATENT DOCUMENTS

| | | | |
|---|---|---|---|
| 5,500,940 | A | 3/1996 | Skeie |
| 5,838,578 | A | 11/1998 | Pippin |
| 6,446,029 | B1 | 9/2002 | Davidson et al. |
| 6,480,809 | B1 | 11/2002 | Slaight |
| 6,539,502 | B1 | 3/2003 | Davidson et al. |
| 2001/0009528 | A1 | 7/2001 | Cooper et al. |
| 2004/0068386 | A1 | 4/2004 | Smith et al. |
| 2004/0078723 | A1 | 4/2004 | Gross et al. |
| 2004/0204899 | A1 | 10/2004 | Gunther et al. |
| 2006/0010352 | A1 | 1/2006 | Mukherjee et al. |

*Primary Examiner*—Marc Duncan
(74) *Attorney, Agent, or Firm*—VanLeeuwen & VanLeeuwen; Diana R. Gerhardt

(57) ABSTRACT

An apparatus, system and method of integrating performance monitor data with thermal event information are provided. A thermal event, in this case, is when the temperature of a chip within which is embedded a processor exceeds a user-configurable value while the processor is processing instructions and/or using storage devices that are being monitored. In any event, when the thermal event occurs, the temperature of the chip along with the performance monitor data is stored for future uses, which include performance and diagnostic analyses.

12 Claims, 4 Drawing Sheets

| THERMAL EVENTS | PROCESSING INSTRUCTIONS | STORAGE CONTROL |
|---|---|---|
| 1<br><br>TEMPERATURE | INSTRUCTIONS$_{Z4}$ | L2 |
| ○<br>○<br>○ | ○<br>○<br>○ | ○<br>○<br>○ |

FIG. 4

| COUNTER | TEMPERATURE | INSTRUCTION | STORAGE CONTROL |
|---|---|---|---|
| 1 | TEMPERATURE | INSTRUCTIONS$_{Z4}$ | L1 |
| ○<br>○<br>○ | ○<br>○<br>○ | ○<br>○<br>○ | ○<br>○<br>○ |

FIG. 5

APPARATUS, SYSTEM AND COMPUTER PROGRAM PRODUCT FOR SEAMLESSLY INTEGRATING THERMAL EVENT INFORMATION DATA WITH PERFORMANCE MONITOR DATA

BACKGROUND OF THE INVENTION

1. Technical Field

The present invention is directed generally to performance monitor units. More specifically, the present invention is directed to an apparatus, system, computer program product and method of seamlessly integrating performance monitor data with thermal event information.

2. Description of Related Art

A performance monitor is a program (software or firmware) that enables a processor to monitor selected system characteristics for performance enhancement and/or diagnostic purposes. Some of the characteristics that may be monitored include the utilization of a processor's instruction execution and storage control. Information relating to a processor's instruction execution may reveal elapsed time between events in a processing system while information relating to storage control may provide access times to a processing system's L1 cache, L2 cache and/or main memory.

Software engineers ordinarily use the information relating to a processor's instruction execution to optimize programs by relocating branch instructions and memory accesses. Information relating to storage control, on the other hand, may be used to identify performance bottlenecks specific to particular software or hardware environments.

Another characteristic that is sometimes monitored is power consumption or heat dissipation. Power consumption is particularly important because circuit density of integrated chips continues to increase. As circuit density increases so does power consumption. To avoid damage to a chip in general, and to a processor in particular, conditions that lead to the processor, or part of the processor, to be hotter than desired need to be detected. Once detected, the processor may take corrective actions to reduce power consumption. These corrective actions usually lead to a reduction in performance.

It is well known that proper system performance analyses include taking into consideration all conditions that impact performance. Thus, thermal events that lead to a system performance reduction have to be taken into consideration during a system performance analysis.

Generally, thermal events (that lead to a system performance reduction) may be obtained provided that power consumption is being monitored. Likewise, utilization of processor's instruction execution and storage control in general may be obtained if monitored. However, the information related to thermal events is not correlated to information related to a processor's instruction execution and storage control. Thus, a user has to manually and painstakingly do so.

Thus, what is needed is an apparatus, system, computer program product and method of seamlessly integrating thermal event information with hardware performance monitor data.

SUMMARY OF THE INVENTION

The present invention provides an apparatus, system and method of integrating performance monitor data with thermal event information. A thermal event, in this case, is when the temperature of a chip within which is embedded a processor exceeds a user-configurable value while the processor is processing instructions and/or using storage devices that are being monitored. In any event, when the thermal event occurs, the temperature of the chip along with the performance monitor data is stored for future uses, which include performance and diagnostic analyses.

In a particular embodiment, when the thermal event occurs, the processor ceases to function to allow the temperature of the chip to decrease below a second user-configurable value. When that happens, the processor may resume its functionality.

In another embodiment, when the thermal event occurs, the number of instructions that the processor may process within a particular span of time may be reduced to allow the temperature of the chip to decrease below a second user-configurable value. To reduce the number of instructions that the processor may process, a clock generator which provides clock signals to the processor may be slowed down or the processor itself may be slowed down (e.g., processor may be allowed to process instructions at every other clock signal).

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 4 depicts a table into which thermal events may be cross-referenced with instructions being processed and storage system in use at the time of the events.

FIG. 5 depicts a representative log file or table into which information may be entered when an instruction is being monitored.

DETAILED DESCRIPTION OF THE PREFERRED EMBODIMENT

Figure 1:
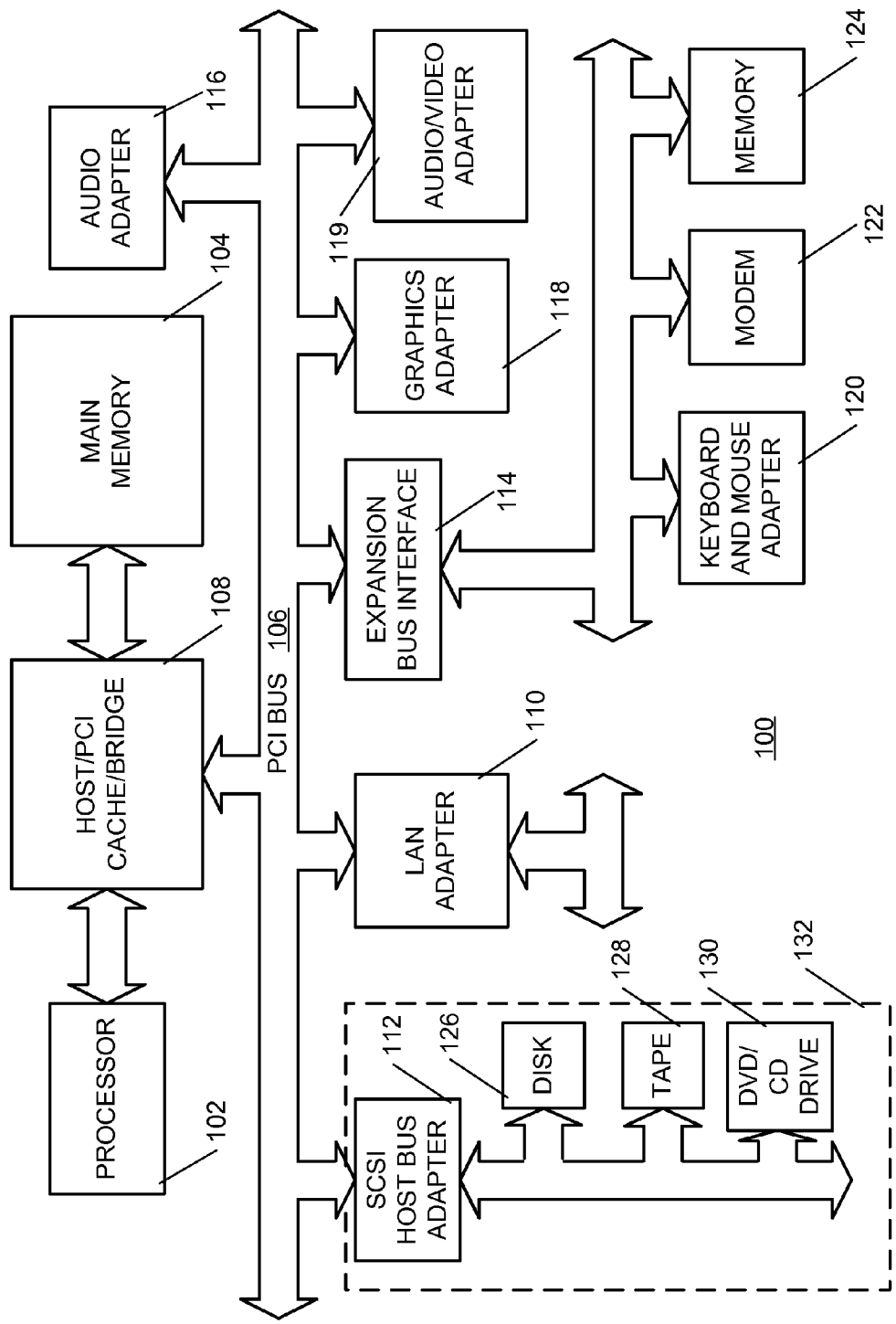
FIG. 1 is a block diagram of a data processor that may be used by the invention.

With reference now to the figures wherein like numerals represent like parts and, in particular to FIG. 1, there is depicted a block diagram of a data processing system in which a preferred embodiment of the present invention may be implemented. Data processing system 100 employs a peripheral component interconnect (PCI) local bus architecture. Although the depicted example employs a PCI bus, other bus architectures such as Accelerated Graphics Port (AGP) and Industry Standard Architecture (ISA) may be used. Processor 102 and main memory 104 are connected to PCI local bus 106 through PCI bridge 108. PCI bridge 108 also may include an integrated memory controller and cache memory for processor 102. Additional connections to PCI local bus 106 may be made through direct component interconnection or through add-in boards. In the depicted example, local area network (LAN) adapter 110, SCSI host bus adapter 112, and expansion bus interface 114 are connected to PCI local bus 106 by direct component connection. In contrast, audio adapter 116, graphics adapter 118, and audio/video adapter 119 are connected to PCI local bus 106 by add-in boards inserted into expansion slots. Expansion bus interface 114 provides a connection for a keyboard and mouse adapter 120, modem 122, and additional memory 124. Small computer system interface (SCSI) host bus adapter 112 provides a connection for hard disk drive 126, tape drive 128, and CD-ROM/DVD drive 130. Typical PCI local bus implementations will support three or four PCI expansion slots or add-in connectors.

An operating system runs on processor 102 and is used to coordinate and provide control of various components within data processing system 100 in FIG. 1. The operating system may be a commercially available operating system, such as Windows XP™, available from Microsoft Corporation or Advanced Interactive eXecutive (AIX), a version of Unix produced by International Business Machines Corporation. An object oriented programming system such as Java may run in conjunction with the operating system and provide calls to the operating system from Java programs or applications executing on data processing system 100. "Java" is a trademark of Sun Microsystems, Inc. Instructions for the operating system, the object-oriented operating system, and applications or programs are located on storage devices, such as hard disk drive 126, and may be loaded into main memory 104 for execution by processor 102.

Those of ordinary skill in the art will appreciate that the hardware in FIG. 1 may vary depending on the implementation. Other internal hardware or peripheral devices, such as flash ROM (or equivalent nonvolatile memory) or optical disk drives and the like, may be used in addition to or in place of the hardware depicted in FIG. 1. Also, the data processing system of FIG. 1 may be a multiprocessor system.

Figure 2:
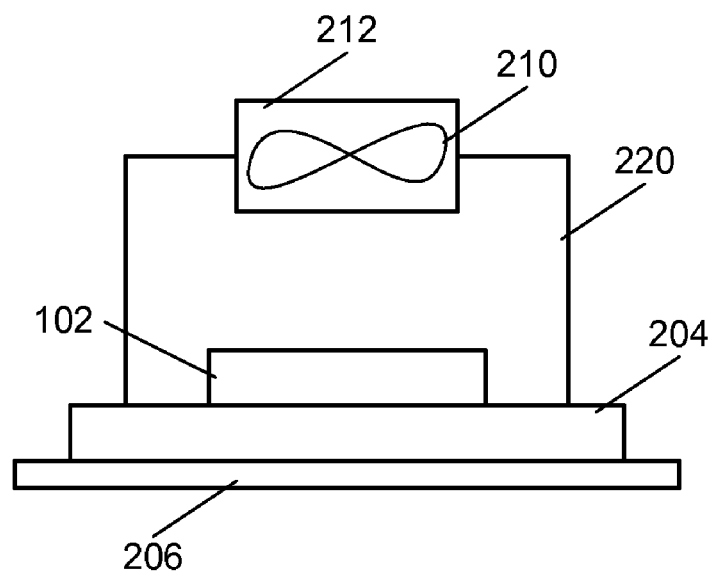
FIG. 2 depicts a cooling fan for a central processing unit (CPU) in the exemplary computer system.

FIG. 2 depicts a mechanical cooling system for a central processing unit (CPU). In FIG. 2, the processor or CPU 102 is shown mounted in socket 204. Socket 204 is connected to a printed circuit board 206 for connection to other components in data processing system 100 in FIG. 1. Socket 204 includes a heatsink (not shown) that facilitates conductive dissipation of heat away from CPU 102.

In addition, a fan 210 is used to provide mechanical cooling to CPU 102. Particularly, fan 210 is mounted in a fan housing 212, which is supported above CPU 102 by a fan housing support bracket 220. Mechanical cooling of CPU 102 is accomplished by fan 210 forcing cool air across CPU 102 under certain circumstances. Note that other types of heat dissipation and mechanical cooling systems may be used with the present invention. Thus, the system shown in FIG. 2 is used for illustrative purposes only.

Figure 3:
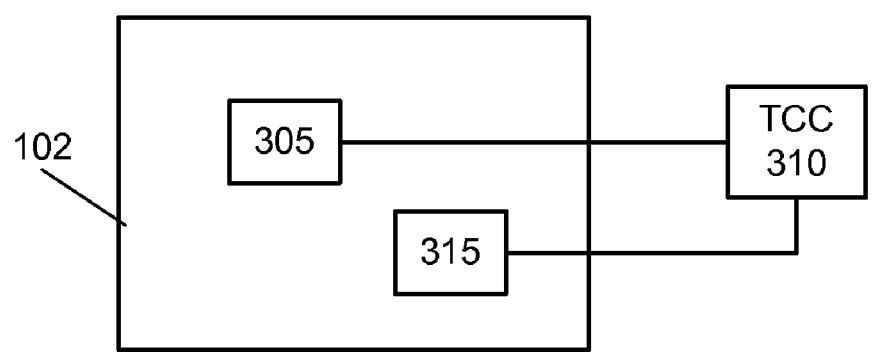
FIG. 3 illustrates a thermal control circuit (TCC) for the CPU in FIG. 2.

FIG. 3 depicts a CPU thermocouple 305. The thermocouple 305 is an on-die thermal sensor which is mounted on an interior surface of CPU 102 to provide a signal representative of a surface temperature of CPU 102. When the surface temperature of CPU 102, as indicated by the signal from the thermocouple 305, is higher than a pre-set threshold temperature, fan 210 may be switched on or its rotational speed increased in order to mechanically cool down the surface temperature of processor 102.

Alternatively, the signal generated by CPU thermocouple 305 may be used to control the temperature of CPU 102 in a number of different methods. For example, in a first method, the signal generated by CPU thermocouple 305 may be used to control the temperature of CPU 102 by throttling the processor 102. Specifically, when a temperature within CPU 102, as measured by CPU thermocouple 305, reaches a first pre-determined level, the number of instructions that the processor 102 processes per second, for example, may be reduced until the temperature of the processor decreases to a number below a second pre-determined level. At that point, the processor may again be allowed to process up to its maximum number of instructions per second.

In a second method, the signal generated by CPU thermocouple 305 may be used to control the temperature of CPU 102 by throttling processor core clock 315. That is, when the temperature within CPU 102 reaches a first pre-determined level, the number of clock signals that the processor core clock 315 generates in a second may be reduced until the temperature of the processor decreases to a number below a second pre-determined level.

In a third method, the signal generated by CPU thermocouple 305 may be used to control the temperature of CPU 102 by modulating (starting and stopping) processor core clock 315. For example, when the temperature within CPU 102, as measured by CPU thermocouple 305, reaches a first pre-determined level, processor core clock 315 may stop providing clock signals until the temperature of the processor decreases to a number below a second pre-determined level.

Note that thermal control circuit (TCC) 310 may be used to convert the signal from thermocouple 305 into a digital signal if the signal from thermocouple 305 is an analog signal. Note also that in any one of the methods described above, performance of the computer system may be adversely affected since CPU 102 may either be performing less work than usual or stop performing work altogether. And, as mentioned before, when analyzing system performance, all conditions that impact performance should be taken into consideration. According to a preferred embodiment of the invention, therefore, when the number of instructions that the processor may process is reduced or when the processor stops performing work altogether, which either case may be referred to as a thermal event, the temperature of the CPU 102, the instruction that is being executed as well as the storage system in use at the time of the thermal event may all be recorded for performance enhancement and/or diagnostic purposes.

FIG. 4 depicts a table into which thermal events may be cross-referenced with instructions being processed and storage system in use at the time of a thermal event. In the example shown, instructions was being processed and the L2 cache was in use when the thermal event occurred.

In an alternate embodiment, when an instruction is being monitored, the temperature of the processor processing the instruction may also be monitored. For example, In U.S. Pat. No. 6,539,502 entitled METHOD AND APPARATUS FOR IDENTIFYING INSTRUCTIONS FOR PERFORMANCE MONITORING IN A MICROPROCESSOR, it is disclosed a method and apparatus for accurately monitoring the execution of instructions within a processor. Further, in U.S. Pat. No. 6,446,029 entitled METHOD AND SYSTEM FOR PROVIDING TEMPORAL THRESHOLD SUPPORT DURING PERFORMANCE MONITORING OF A PIPELINED PROCESSOR, it is disclosed a method and system for monitoring the performance of an instruction pipeline. Both patents have a common assignee as the present patent application.

In any case, in the afore-mentioned patents, the disclosures of which are herein incorporated by reference, it is disclosed a performance monitor that may be used to provide information concerning the utilization of processor instruction execution and storage control. The performance monitor is shown to include a number of performance monitor counters that are used to count processor/storage related events. Particularly, when an instruction is being monitored, a counter is incremented each time the instruction is processed. According to the invention, on each increment of the counter, the temperature of the processor, the value of the counter, the instruction being monitored, and the storage system in use may all be recorded and stored in a log file or table.

FIG. 5 depicts a representative log file or table into which the information may be entered. In this particular example, the instruction being monitored is instructions and the storage in use is the L1 cache. This information, including the temperature of the processor is entered into the file or table when the counter value becomes one (1).

Figure 6:
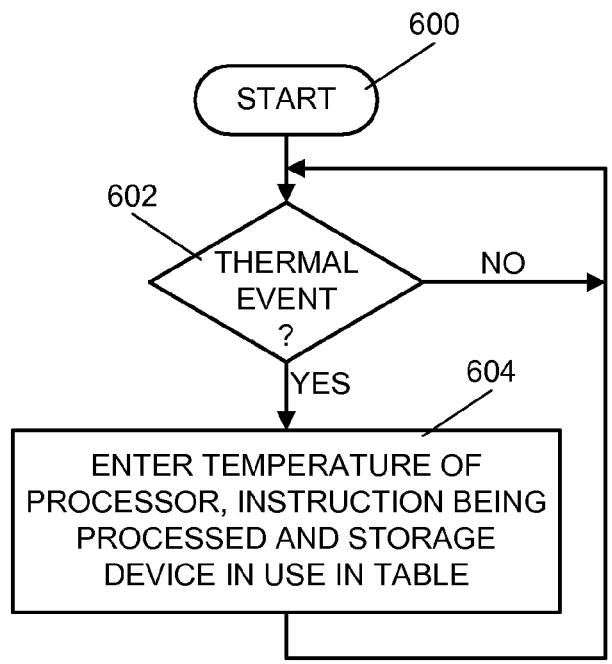
FIG. 6 is a flow diagram of a first process that may be used by the present invention.

FIG. 6 is a flowchart of a first process that may be used by the present invention. The process starts when the computer system is turned on or is reset (step 600). Once started, the process will continuously check to determine whether a thermal event has occurred (step 602). If so, the temperature of the processor, the instruction being processed and the storage device in use may all be entered into a table (step 604).

As mentioned above, a thermal event occurs when the clock core 315 stops to provide clock signals to the processor 102 because the temperature of the processor 102 has exceeded a first pre-determined number that may be user-configurable. The clock core 315 may resume its activity when the temperature of the processor decreases to a value below a second pre-determined number, which may be user-configurable also. An indication that the clock core has resumed its activity may also be entered into the table. In such a case, the time the thermal event occurs as well as the time the clock core resumes its activity may also be entered into the table. In any event, after entering the information into the table, the process may return to step 602. The process will end when the computer system is turned off.

Figure 7:
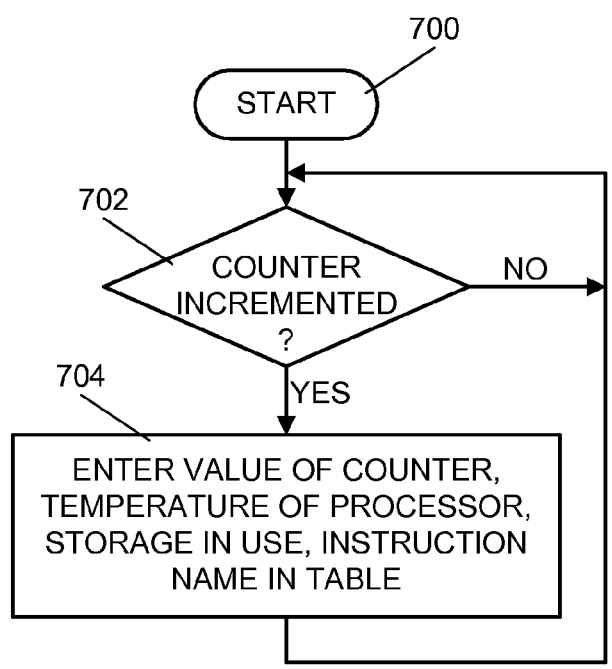
FIG. 7 is a flow diagram of a second process that may be used by the present invention.

FIG. 7 is a flowchart of a second process that may be used by the present invention. The process starts when the performance monitor unit, as described in U.S. Pat. Nos. 6,539,502 and 6,446,029, is to monitor an instruction (step 700). Then, a check will continuously be made to determine whether the counter has incremented (step 702). As explained in the patents, each time the counter is incremented, it is an indication that the instruction being monitored is being processed. Thus, when the counter is incremented, the value of the counter, the temperature of the processor, the storage device in use as well as the name of the instruction, in case more than one instruction is being monitored, may be entered into a table (step 704). After the entry, the process may return to step 702. The process may end when the instruction (or all instructions) being monitored is no longer being processed.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer readable medium comprising a computer program product for integrating performance monitor data with thermal event information, a thermal event being a temperature of a chip exceeding a user-configurable value, the performance monitor data including information on instructions and/or storage devices being monitored, the computer program product comprising:
   code means for determining whether a thermal event has occurred; and
   code means for storing in a file, if a thermal event has occurred, the temperature of the chip along with the performance monitor data wherein the performance monitor data includes data identifying an instruction that is being processed by a processor within the chip when the thermal event occurs.

2. The computer program product of claim 1 wherein when the thermal event occurs, the processor ceases to function.

3. The computer program product of claim 2 wherein when the temperature falls below a second user-configurable value, the processor resumes its functionality.

4. The computer program product of claim 1 wherein when the thermal event occurs, the number of instructions that the processor may process in a particular span of time is reduced.

5. The computer program product of claim 4 wherein the number of instructions that the processor may process may be reduced by throttling the processor or by throttling a clock signal generator.

6. The computer program product of claim 1 wherein the performance monitor data includes data identifying a storage device that is being used when the thermal event occurs.

7. A computer system being enabled to integrate performance monitor data with thermal event information, a thermal event being a temperature of a chip exceeding a user-configurable value, the performance monitor data including information on instructions and/or storage devices being monitored, the computer system comprising:
   at least one storage device for storing code data; and
   at least one processor for processing the code data to determine whether a thermal event has occurred, and to store in a file, if a thermal event has occurred, the temperature of the chip along with the performance monitor data wherein the performance monitor data includes data identifying an instruction that is being processed by a processor within the chip when the thermal event occurs.

8. The computer system of claim 7 wherein when the thermal event occurs, the processor ceases to function.

9. The computer system of claim 8 wherein when the temperature falls below a second user-configurable value, the processor resumes its functionality.

10. The computer system of claim 7 wherein when the thermal event occurs, the number of instructions that the processor may process in a particular span of time is reduced.

11. The computer system of claim 10 wherein the number of instructions that the processor may process may be reduced by throttling the processor or by throttling a clock signal generator.

12. The computer system of claim 7 wherein the performance monitor data includes data identifying a storage device that is being used when the thermal event occurs.

* * * * *